Nov. 13, 1923.
W. T. GULLEDGE
1,473,623
TIRE MOUNTING
Filed Feb. 21, 1922
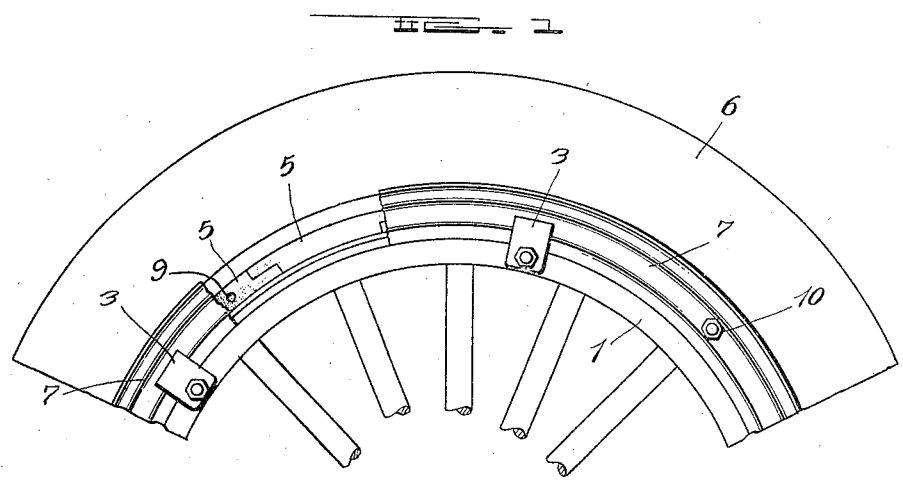
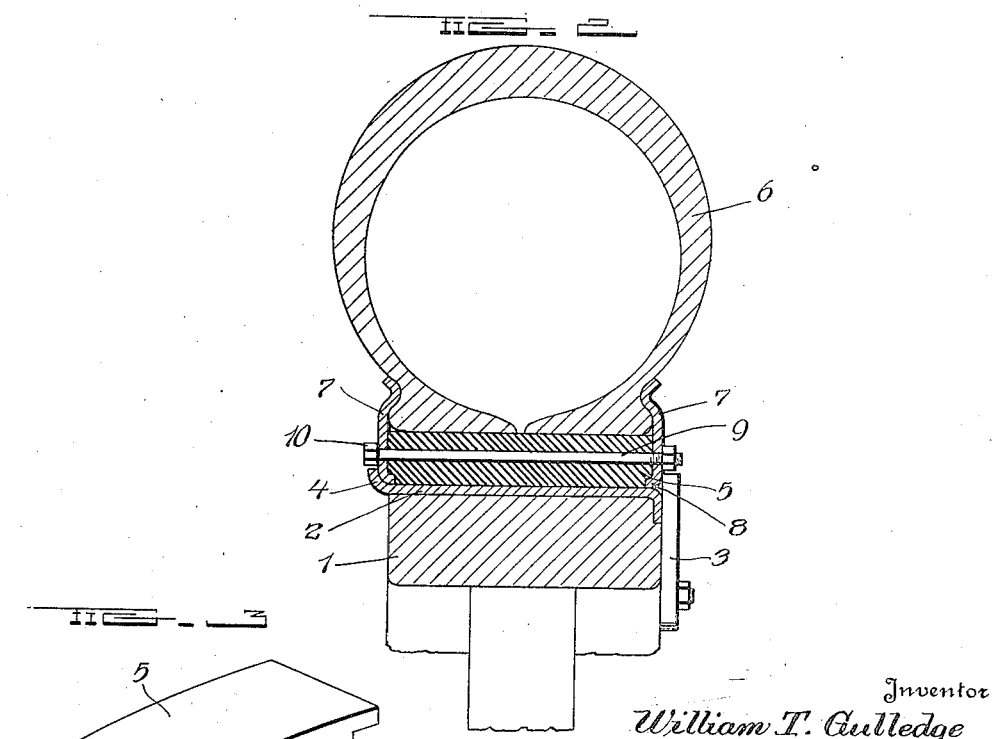
Inventor
William T. Gulledge
By Townshend & Townshend
Attorney Patented Nov. 13, 1923.

1,473,623

UNITED STATES PATENT OFFICE.

WILLIAM T. GULLEDGE, OF MATTHEWS, NORTH CAROLINA.

TIRE MOUNTING.

Application filed February 21, 1922. Serial No. 538,262.

*To all whom it may concern:*

Be it known that I, WILLIAM T. GULLEDGE, a citizen of the United States, residing at Matthews, in the county of Macklenburg and State of North Carolina, have invented certain new and useful Improvements in a Tire Mounting, of which the following is a specification.

My invention relates to a tire mounting for use primarily with pneumatic tires. The primary object is to provide an improved mounting for the tire in which the ordinary demountable rim is elimated, and effectual means are provided for cushioning the tire between the tread base and the rim of the wheel.

Another object of the invention is to provide a mounting of this character which is readily applied and assembled or disassembled by the manipulation of proportionately few members comprising the mounting.

Another object of the invention is to provide a mounting of this character which can be applied if desired in a unit in much the same manner as the ordinary demountable rim is now used.

With these and such other objects in view, as will be apparent from the description, my invention resides in the novel construction, combination and arrangement of parts hereinafter described and claimed and illustrated in the accompanying drawings, in which—

Figure 1 is a fragmentary elevation of a wheel and tire equipped with my invention;

Figure 2, a vertical section through Figure 1; and

Figure 3 a detail of the cushioning blocks employed.

In the preferred embodiment of the invention, it is shown as applied to the rim of a wheel 1, equipped with the ordinary felly band 2 and the usual rim retaining lugs 3. As with the usual construction, the felly band 2 is provided with the flange 4 on the inner side of the wheel.

The invention in detail comprises rubber filler blocks 5, which are set upon the felly band 2, extending entirely around the rim of the wheel and being joined in lapping relation as illustrated in Figure 3. These blocks are of sufficient thickness to fill completely the space existing between the felly band of the wheel and the tread base of a tire casing 6, when, as in the present instance, the usual demountable rim is dispensed with. The blocks 5 are placed in between the tire casing and the felly band in assembling the mounting, and are held in place by means of ring members 7, applied at opposite sides of the wheel.

These ring members 7 comprise metal castings of sufficient dimension to cover completely the rubber blocks 5 and extend upwardly to engage in the depression of the tire bead on either side, being curved at these points to conform to the configuration of the tire casing. The inner edges of the ring 7 are bent inwardly slightly to provide flanges 8 which engage under the outer edges of the blocks 5, as clearly illustrated in Figure 2.

Transverse bolts 9 are provided at spaced intervals around the periphery and extend through the ring members 7 and blocks 5 carrying on their outer ends nuts 10, whereby the rings 7 may be clamped against the rubber blocks and tire casing. The entire mounting is held in position upon the wheel by means of the ordinary rim lugs 3 which, when tightened, serve to bind the mounting against the inner flange 4 of the felly band 2.

When it is desired to disassemble the mounting, lugs 3 are loosened and the bolts 9 extracted, after which the ring 7 may be removed and the rubber blocks 5 will fall down over the space they occupy between the tire casing and the wheel rim.

If desired, the rubber blocks 5 may be clamped in position by means of the rings and secured on the tire casing, after which the device may be applied as a unit to the wheel, or the parts may be assembled by first placing the blocks on the rim, mounting the tire casing thereover, applying and bolting the rings 7 in the manner specified, and attaching the entire mounting to the wheel by means of the lugs 3.

While I have illustrated and described in this preferred form certain details and materials which enter into the construction and operation of the invention, I desire it to be understood that I do not intend to limit myself to these, but that any such may be used as will fall within the scope of the invention as claimed.

I claim:

1. A tire mounting, comprising a plurality of filler members adapted to be directly mounted on the felly band of a wheel between the band and the bottom of a tire casing, means for clamping said members to prevent individual lateral movement, and means for securing said members on the felly band of a wheel.

2. A tire mounting, comprising a plurality of filler members adapted to be directly mounted on the felly band of a wheel between said band and the bottom of a tire casing, means for securing said members against individual lateral movement, said means being adapted to engage a tire casing bead, and means for securing said members in position on the wheel.

3. A tire mounting comprising filler members adapted to be disposed on the felly band of a wheel between the band and a tire casing, annular bands adapted to be disposed on opposite sides of said filler members, said bands being formed to engage a portion of a tire casing, means for clamping said bands in position at opposite sides of said members, and means for securing said bands and members on a wheel.

4. A tire mounting comprising the combination with a wheel equipped with a felly band and a tire, of filler blocks adapted to be disposed between said felly band and the tire casing, annular bands adapted to be disposed at opposite sides of the filler members and formed to engage a portion of the tire, means for clamping said annular bands against said members and tire, and means for securing said bands, members and tire on the felly band of the wheel.

5. A tire mounting comprising the combination with a wheel equipped with a felly band and a pneumatic tire, of a plurality of cushion filler members, disposed in overlapping relation on the felly band between said band and the tire casing, annular bands adapted to be disposed on opposite sides of said filler members, and formed to engage the tire bead, whereby to secure said members and tire casing and prevent individual lateral movement of said members, clamping bolts adapted to extend transversely through said bands and filler members at peripherally spaced intervals whereby said bands are clamped against said filler members and tire casing, and means for securing said bands, members and casing on the wheel.

6. A tire mounting comprising the combination with a wheel provided with a felly band having an inner flange thereon, and demountable rim lugs on the opposite side thereof, and a pneumatic tire, of cushion filler members disposed in overlapped relation between the felly band and the tire casing, annular bands disposed at opposite sides of the filler members and formed to engage at one edge of the tire bead and at the opposite edge the under surface of the filler members, bolts extending through said bands and filler members, nuts on said bolts for clamping said bands against the filler members and tire casing, said demountable rim lugs being adapted to secure said bands, members and casing on the wheel against the inner flange of the felly bands.

In testimony whereof I affix my signature.

WILLIAM T. GULLEDGE.